(12) United States Patent
Kimura

(10) Patent No.: US 11,199,397 B2
(45) Date of Patent: Dec. 14, 2021

(54) DISTANCE MEASUREMENT USING A LONGITUDINAL GRID PATTERN

(71) Applicant: Magik Eye Inc., New York, NY (US)

(72) Inventor: Akiteru Kimura, Hachioji (JP)

(73) Assignee: MAGIK EYE INC., New York, NY (US)

( * ) Notice: Subject to any disclaimer, the term of this patent is extended or adjusted under 35 U.S.C. 154(b) by 554 days.

(21) Appl. No.: 16/150,918

(22) Filed: Oct. 3, 2018

(65) Prior Publication Data

US 2019/0107387 A1     Apr. 11, 2019

Related U.S. Application Data

(60) Provisional application No. 62/569,543, filed on Oct. 8, 2017.

(51) Int. Cl.
*G01B 11/25* (2006.01)
*G01C 3/08* (2006.01)
(Continued)

(52) U.S. Cl.
CPC ............ *G01B 11/25* (2013.01); *G01B 11/026* (2013.01); *G01C 3/08* (2013.01); *G06K 9/00791* (2013.01); *G06T 2207/10028* (2013.01)

(58) Field of Classification Search
CPC .... G01N 33/5308; G01N 33/74; G01N 21/51; G01N 23/046; G01N 2223/419;
(Continued)

(56) References Cited

U.S. PATENT DOCUMENTS

| 4,914,460 A | 4/1990 | Caimi et al. |
| 5,699,444 A | 12/1997 | Palm |

(Continued)

FOREIGN PATENT DOCUMENTS

| CN | 101794065 A | 8/2010 |
| CN | 103428026 A | 4/2013 |

(Continued)

OTHER PUBLICATIONS

International Search Report and Written Opinion mailed in corresponding PCT/US2018/054183 dated Mar. 29, 2019, 11 pages.
(Continued)

*Primary Examiner* — Michael P Stafira
(74) *Attorney, Agent, or Firm* — Tong, Rea, Bentley & Kim, LLC

(57) ABSTRACT

A projection pattern is projected onto a surface of an object from a projection point of a distance by projecting a plurality of beams of light from the projection point. The plurality of beams of light creates a plurality of projection artifacts that is arranged in a grid on the surface of the object. A center projection artifact lies at an intersection of a grid longitude line and a grid latitude line. A projection of the plurality of beams is adjusted so that the longitude line and/or the latitude line is rotated by a predetermined amount from an original position to a new position, resulting in an adjusted projection pattern on the surface of the object. An image of the object, including at least a portion of the adjusted projection pattern, is captured. A distance from the distance sensor to the object is calculated using information from the image.

18 Claims, 12 Drawing Sheets

(51) Int. Cl.
*G01B 11/02* (2006.01)
*G06K 9/00* (2006.01)

(58) Field of Classification Search
CPC ....... G01N 2223/505; G01N 33/54373; G01N 33/56972; G01N 33/82; G01N 2035/00495; G01N 2223/108; G01N 23/2255; G01N 35/10; G01N 1/4077; G01N 2001/4083; G01N 2035/1018; G01N 21/00; G01N 21/0303; G01N 21/59; G01N 2333/575; G01N 2333/62; G01N 2333/91188; G01N 2333/96463; G01N 33/54326; G01N 33/54393; G01N 33/56983; G01N 33/573; G01N 33/743; G01N 33/80; G01N 33/92; G01N 21/31; G01N 21/636; G01N 2333/726; G01N 2458/00; G01N 2500/02; G01N 2500/04; G01N 33/54313; G01N 33/56966; G01N 33/583; G01N 33/587; G01N 33/6845; G01N 23/207; G01N 11/00; G01N 15/1436; G01N 15/1459; G01N 2011/008; G01N 2021/0346; G01N 2021/4707; G01N 2021/4709; G01N 2021/513; G01N 21/03; G01N 2201/08; G01N 2223/611; G01N 15/0211; G01N 2015/0222; G01N 23/201; G01N 33/582; G01N 2035/0094; G01N 21/84; G01N 2333/75; G01N 33/4905; G01N 33/86; G01N 35/0092; G01N 15/14; G01N 15/1434; G01N 2015/0038; G01N 2015/0238; G01N 2015/025; G01N 2015/0277; G01N 2035/00881; G01N 21/25; G01N 21/4795; G01N 21/6428; G01N 21/65; G01N 21/9501; G01N 21/95623; G01N 2201/0675; G01N 2201/129; G01N 2223/302; G01N 2223/306; G01N 2223/639; G01N 2223/643; G01N 2223/645; G01N 23/04; G01N 23/203; G01N 15/0205; G01N 15/1427; G01N 15/1429; G01N 15/1456; G01N 15/1463; G01N 15/1475; G01N 15/1484; G01N 2015/0053; G01N 2015/0092; G01N 2015/1006; G01N 2015/1075; G01N 2015/1402; G01N 2015/1438; G01N 2015/1454; G01N 2021/1785; G01N 2021/479; G01N 2021/6471; G01N 2030/8447; G01N 2035/00326; G01N 21/53; G01N 21/6408; G01N 21/645; G01N 21/6458; G01N 2201/1045; G01N 23/041; G01N 23/18; G01N 23/20; G01N 23/20008; G01N 23/20016; G01N 23/20025; G01N 23/205; G01N 23/2055; G01N 30/74; G01N 33/381; G01N 33/552; G01N 33/553; G01N 35/00069; G01N 35/00871; G01N 35/026; G01N 35/1065; G01N 35/1097; G01B 11/2513; G01B 11/25; G01B 11/24; G01B 11/2545; G01B 11/2518; G01B 11/2509; G01B 11/245; G01B 11/026; G01B 11/002; G01B 11/254; G01B 11/00; G01B 21/042; G01B 11/2504; G01B 11/005; G01B 11/02; G01B 11/27; G01B 11/2527; G01B 11/2531; G01B 11/22; G01B 11/14; G01B 5/012; G01B 5/008; G01B 11/26; G01B 11/03; G01B 11/2522; G01B 11/2536; G01B 2210/58; G01B 21/047; G01B 11/06; G01B 11/007; G01B 21/045; G01B 11/0608; G01B 11/08; G01B 11/303; G01B 9/0209; G01B 11/0625; G01B 11/0675; G01B 11/162; G01B 21/18; G01B 9/02044; G01B 11/2441; G01B 11/255; G01B 2210/52; G01B 2290/45; G01B 9/02021; G01B 9/02025; G01B 9/02027; G01B 9/02087; G01B 11/022; G01B 17/06; G01B 2210/56; G01B 5/0014; G01B 9/02095; G01B 11/272; G01B 21/20; G01B 5/0028; G01B 9/02; G01B 11/028; G01B 11/161; G01B 11/2755; G01B 11/306; G01B 2210/286; G01B 3/30; G01B 7/004; G01B 7/012; G01B 9/00; G01B 11/024; G01B 11/165; G01B 11/167; G01B 11/2433; G01B 11/30; G01B 15/04; G01B 2290/15; G01B 2290/50; G01B 2290/70; G01B 5/0004; G01B 7/22; G01B 9/0201; G01B 9/02018; G01B 9/02032; G01B 9/02049; G01B 9/02061; G01B 9/02085; G01B 9/04; G01B 11/10; G01B 11/12; G01B 11/16; G01B 11/2416; G01B 15/00; G01B 17/00; G01B 21/04; G01B 2290/60; G01B 5/0016; G01B 5/004; G01B 9/02002; G01B 9/02004; G01B 9/02069; G01B 9/02079; G01B 9/02097

See application file for complete search history.

(56) References Cited

U.S. PATENT DOCUMENTS

| | | | |
|---|---|---|---|
| 5,730,702 | A | 3/1998 | Tanaka et al. |
| 5,870,136 | A | 2/1999 | Fuchs et al. |
| 5,980,454 | A | 11/1999 | Broome |
| 6,038,415 | A | 3/2000 | Nishi et al. |
| 6,442,476 | B1 | 8/2002 | Poropat |
| 6,668,082 | B1 | 12/2003 | Davison et al. |
| 6,937,350 | B2 | 8/2005 | Shirley |
| 7,191,056 | B2 | 3/2007 | Costello et al. |
| 7,193,645 | B1 | 3/2007 | Aagaard et al. |
| 7,375,803 | B1 | 5/2008 | Bamji |
| 7,589,825 | B2 | 9/2009 | Orchard et al. |
| 9,098,909 | B2 | 8/2015 | Nomura |
| 9,488,757 | B2 | 11/2016 | Mukawa |
| 9,536,339 | B1 | 1/2017 | Worley et al. |
| 9,686,539 | B1 | 6/2017 | Zuliani et al. |
| 9,888,225 | B2 | 2/2018 | Znamensky et al. |
| 9,986,208 | B2 | 5/2018 | Chao et al. |
| 10,223,793 | B1 | 3/2019 | Ebrahimi et al. |
| 2003/0071891 | A1 | 4/2003 | Geng |
| 2004/0167744 | A1 | 8/2004 | Lin et al. |
| 2005/0288956 | A1 | 12/2005 | Speicher |
| 2006/0044546 | A1 | 3/2006 | Lewin et al. |
| 2006/0055942 | A1 | 3/2006 | Krattiger |
| 2006/0290781 | A1 | 12/2006 | Hama |
| 2007/0091174 | A1 | 4/2007 | Kochi et al. |
| 2007/0165243 | A1 | 7/2007 | Kang et al. |
| 2007/0206099 | A1 | 9/2007 | Matsuo |
| 2008/0259354 | A1* | 10/2008 | Gharib ............... H04N 13/204 356/601 |
| 2010/0007719 | A1 | 1/2010 | Frey et al. |
| 2010/0149315 | A1 | 6/2010 | Qu et al. |
| 2010/0209002 | A1* | 8/2010 | Thiel ................. A61B 5/1077 382/206 |
| 2010/0223706 | A1 | 9/2010 | Becker et al. |
| 2010/0238416 | A1 | 9/2010 | Kuwata |

(56) References Cited

U.S. PATENT DOCUMENTS

| | | | |
|---|---|---|---|
| 2010/0303341 A1* | 12/2010 | Hausler | G01B 11/2513 382/154 |
| 2011/0037849 A1 | 2/2011 | Niclass et al. | |
| 2011/0188054 A1 | 8/2011 | Petronius et al. | |
| 2012/0051588 A1 | 3/2012 | Mceldowney | |
| 2012/0056982 A1 | 3/2012 | Katz et al. | |
| 2012/0062758 A1 | 3/2012 | Devine et al. | |
| 2012/0105867 A1* | 5/2012 | Komatsu | G01B 11/25 356/610 |
| 2012/0113252 A1 | 5/2012 | Yang et al. | |
| 2012/0219699 A1 | 8/2012 | Pettersson | |
| 2012/0225718 A1 | 9/2012 | Zhang | |
| 2012/0236317 A1 | 9/2012 | Nomura | |
| 2012/0307260 A1* | 12/2012 | Keshavmurthy | G01B 11/2518 356/610 |
| 2013/0038882 A1 | 2/2013 | Umeda et al. | |
| 2013/0076865 A1 | 3/2013 | Tateno et al. | |
| 2013/0088575 A1 | 4/2013 | Park et al. | |
| 2013/0155417 A1 | 6/2013 | Ohsawa | |
| 2013/0242090 A1 | 9/2013 | Yoshikawa | |
| 2013/0307933 A1 | 11/2013 | Znamensky et al. | |
| 2013/0314688 A1 | 11/2013 | Likholyot | |
| 2014/0000520 A1 | 1/2014 | Bareket | |
| 2014/0009571 A1 | 1/2014 | Geng | |
| 2014/0016113 A1 | 1/2014 | Holt et al. | |
| 2014/0036096 A1 | 2/2014 | Sterngren | |
| 2014/0071239 A1 | 3/2014 | Yokota | |
| 2014/0085429 A1 | 3/2014 | Hébert | |
| 2014/0125813 A1 | 5/2014 | Holz | |
| 2014/0207326 A1 | 7/2014 | Murphy | |
| 2014/0241614 A1 | 8/2014 | Lee | |
| 2014/0275986 A1 | 9/2014 | Vertikov | |
| 2014/0320605 A1 | 10/2014 | Johnson | |
| 2015/0009301 A1 | 1/2015 | Ribnick et al. | |
| 2015/0012244 A1 | 1/2015 | Oki | |
| 2015/0062558 A1 | 3/2015 | Koppal et al. | |
| 2015/0077764 A1 | 3/2015 | Braker et al. | |
| 2015/0131054 A1 | 5/2015 | Wuellner et al. | |
| 2015/0160003 A1 | 6/2015 | Terry et al. | |
| 2015/0171236 A1 | 6/2015 | Murray | |
| 2015/0248796 A1 | 9/2015 | Iyer et al. | |
| 2015/0268399 A1 | 9/2015 | Futterer | |
| 2015/0288956 A1 | 10/2015 | Mallet et al. | |
| 2015/0323321 A1 | 11/2015 | Oumi | |
| 2015/0336013 A1 | 11/2015 | Stenzier et al. | |
| 2015/0347833 A1* | 12/2015 | Robinson | G01B 11/25 348/77 |
| 2015/0381907 A1 | 12/2015 | Boetliger et al. | |
| 2016/0022374 A1 | 1/2016 | Haider | |
| 2016/0041266 A1 | 2/2016 | Smits | |
| 2016/0050401 A1* | 2/2016 | Gordon | G01B 11/2513 348/744 |
| 2016/0117561 A1 | 4/2016 | Miyazawa et al. | |
| 2016/0128553 A1 | 5/2016 | Geng | |
| 2016/0157725 A1 | 6/2016 | Munoz | |
| 2016/0178915 A1 | 6/2016 | Mor et al. | |
| 2016/0249810 A1 | 9/2016 | Darty et al. | |
| 2016/0261854 A1 | 9/2016 | Ryu et al. | |
| 2016/0267682 A1 | 9/2016 | Yamashita | |
| 2016/0288330 A1 | 10/2016 | Konolige | |
| 2016/0327385 A1 | 11/2016 | Kimura | |
| 2016/0328854 A1 | 11/2016 | Kimura | |
| 2016/0334939 A1 | 11/2016 | Dawson et al. | |
| 2016/0350594 A1 | 12/2016 | McDonald | |
| 2016/0379368 A1 | 12/2016 | Sakas et al. | |
| 2017/0067734 A1* | 3/2017 | Heidemann | G01C 15/002 |
| 2017/0098305 A1 | 4/2017 | Gossow | |
| 2017/0102461 A1 | 4/2017 | Tezuka et al. | |
| 2017/0221226 A1 | 8/2017 | Shen et al. | |
| 2017/0270689 A1 | 9/2017 | Messely et al. | |
| 2017/0284799 A1 | 10/2017 | Wexler et al. | |
| 2017/0307544 A1 | 10/2017 | Nagata | |
| 2017/0347086 A1 | 11/2017 | Watanabe | |
| 2018/0010903 A1 | 1/2018 | Takao et al. | |
| 2018/0011194 A1 | 1/2018 | Masuda et al. | |
| 2018/0073863 A1 | 3/2018 | Watanabe | |
| 2018/0080761 A1 | 3/2018 | Takao et al. | |
| 2018/0143018 A1 | 5/2018 | Kimura | |
| 2018/0156609 A1 | 6/2018 | Kimura | |
| 2018/0227566 A1 | 8/2018 | Price et al. | |
| 2018/0249142 A1 | 8/2018 | Hicks et al. | |
| 2018/0324405 A1 | 11/2018 | Thirion | |
| 2018/0329038 A1 | 11/2018 | Lin et al. | |
| 2018/0357871 A1 | 12/2018 | Siminoff | |
| 2019/0064359 A1 | 2/2019 | Yang | |
| 2019/0108743 A1 | 4/2019 | Kimura | |
| 2019/0122057 A1* | 4/2019 | Kimura | G01B 11/2513 |
| 2019/0295270 A1 | 9/2019 | Kimura | |
| 2019/0297241 A1 | 9/2019 | Kimura | |
| 2019/0297278 A1 | 9/2019 | Sumi et al. | |
| 2019/0377088 A1 | 12/2019 | Kimura | |
| 2020/0003556 A1 | 1/2020 | Kimura | |
| 2020/0051268 A1 | 2/2020 | Kimura | |
| 2020/0077010 A1 | 3/2020 | Noguchi | |
| 2020/0092524 A1* | 3/2020 | Morris | H04N 9/3185 |
| 2020/0182974 A1 | 6/2020 | Kimura | |
| 2020/0236315 A1 | 7/2020 | Kimura | |
| 2020/0278197 A1* | 9/2020 | Tokimitsu | G06K 9/03 |

FOREIGN PATENT DOCUMENTS

| | | | | |
|---|---|---|---|---|
| CN | 103196385 A | 7/2013 | | |
| CN | 103559735 A | 2/2014 | | |
| CN | 104160243 A | 11/2014 | | |
| CN | 104515514 A | 4/2015 | | |
| CN | 104685868 A | 6/2015 | | |
| CN | 106796179 A | 5/2017 | | |
| DE | 102016118562 A1 * | 3/2017 | | H04N 13/254 |
| EP | 0358628 A2 | 3/1990 | | |
| EP | 1 739 391 A2 | 1/2007 | | |
| EP | 3 171 129 A1 | 5/2017 | | |
| JP | H045112 A | 2/1992 | | |
| JP | H0961126 A | 3/1997 | | |
| JP | 2006-313116 A | 11/2006 | | |
| JP | 2007-10346 A | 1/2007 | | |
| JP | 2007-187581 A | 7/2007 | | |
| JP | 2007-315864 A | 12/2007 | | |
| JP | 2010-091855 A | 4/2010 | | |
| JP | 2010-101683 A | 5/2010 | | |
| JP | 4485365 B2 | 6/2010 | | |
| JP | 2010-256182 A | 11/2010 | | |
| JP | 2012-047500 A | 3/2012 | | |
| JP | 2013-8513179 A | 4/2013 | | |
| JP | 2014-020978 A | 2/2014 | | |
| JP | 2014-511590 A | 5/2014 | | |
| JP | 2014-122789 A | 7/2014 | | |
| JP | 6038415 B1 | 12/2016 | | |
| JP | 6241793 B2 | 12/2017 | | |
| JP | 2019-203822 A | 11/2019 | | |
| KR | 10-2013-0000356 A | 1/2013 | | |
| KR | 10-2013-0037152 A | 4/2013 | | |
| KR | 10-2015-0101749 A | 9/2015 | | |
| KR | 10-2016-0020323 | 2/2016 | | |
| KR | 10-2017-0005649 A | 1/2017 | | |
| KR | 10-2017-0054221 A | 5/2017 | | |
| KR | 10-2017-0094968 | 8/2017 | | |
| TW | I320480 B | 2/2010 | | |
| TW | I451129 B | 4/2012 | | |
| WO | WO 2012/081506 A1 | 6/2012 | | |
| WO | WO/2013/145164vA1 | 10/2013 | | |
| WO | WO 2014/106843 A2 | 7/2014 | | |
| WO | WO 2014/131064 | 8/2014 | | |
| WO | WO 2015/166915 A1 | 11/2015 | | |
| WO | WO-2017053368 A1 * | 3/2017 | | A61B 5/6844 |

OTHER PUBLICATIONS

Extended European Search Report mailed in corresponding 18864725.9 dated Jun. 21, 2021, 8 pages.

* cited by examiner

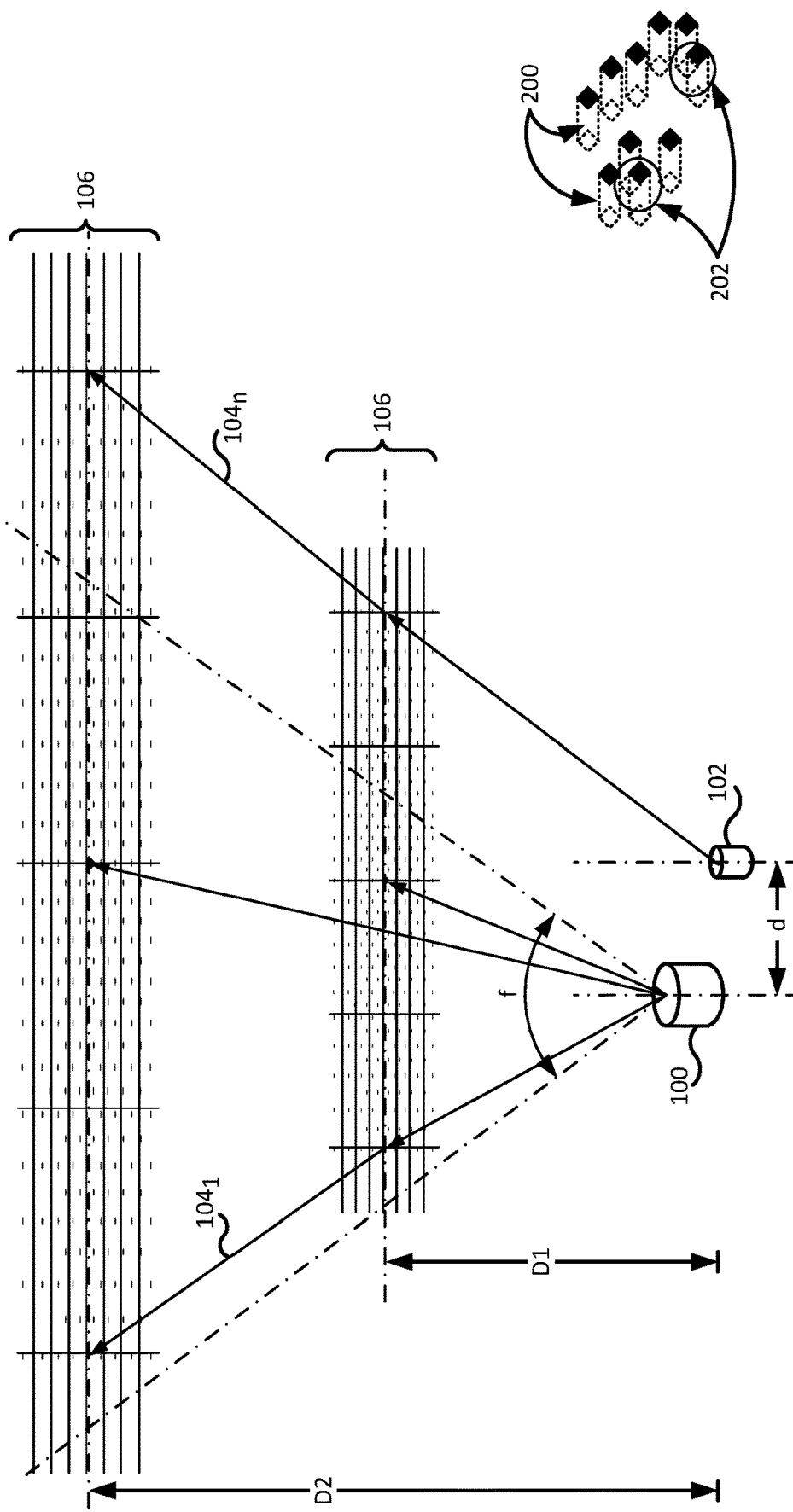

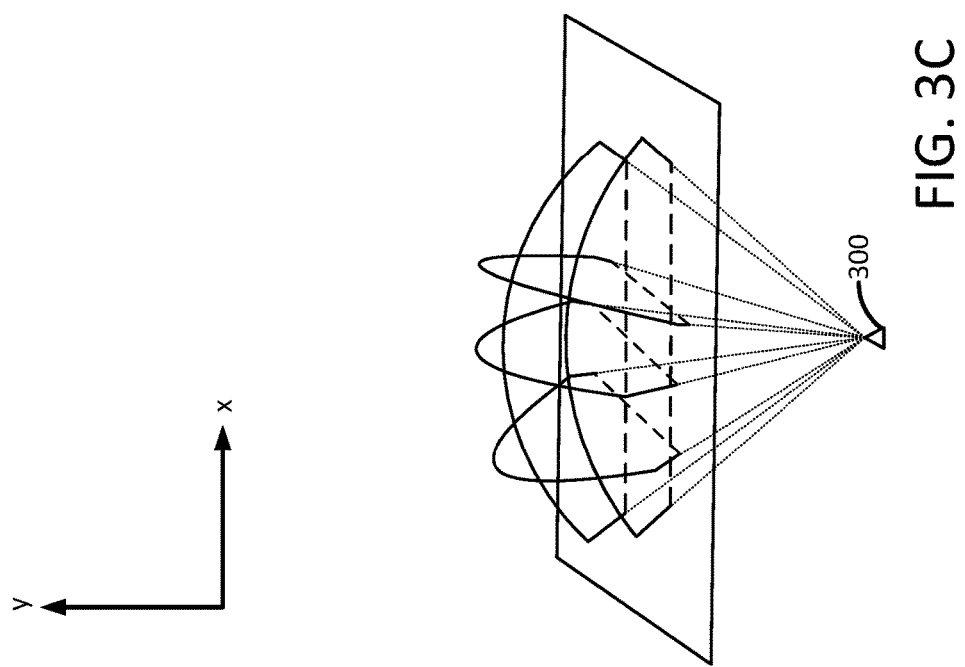
FIG. 3C
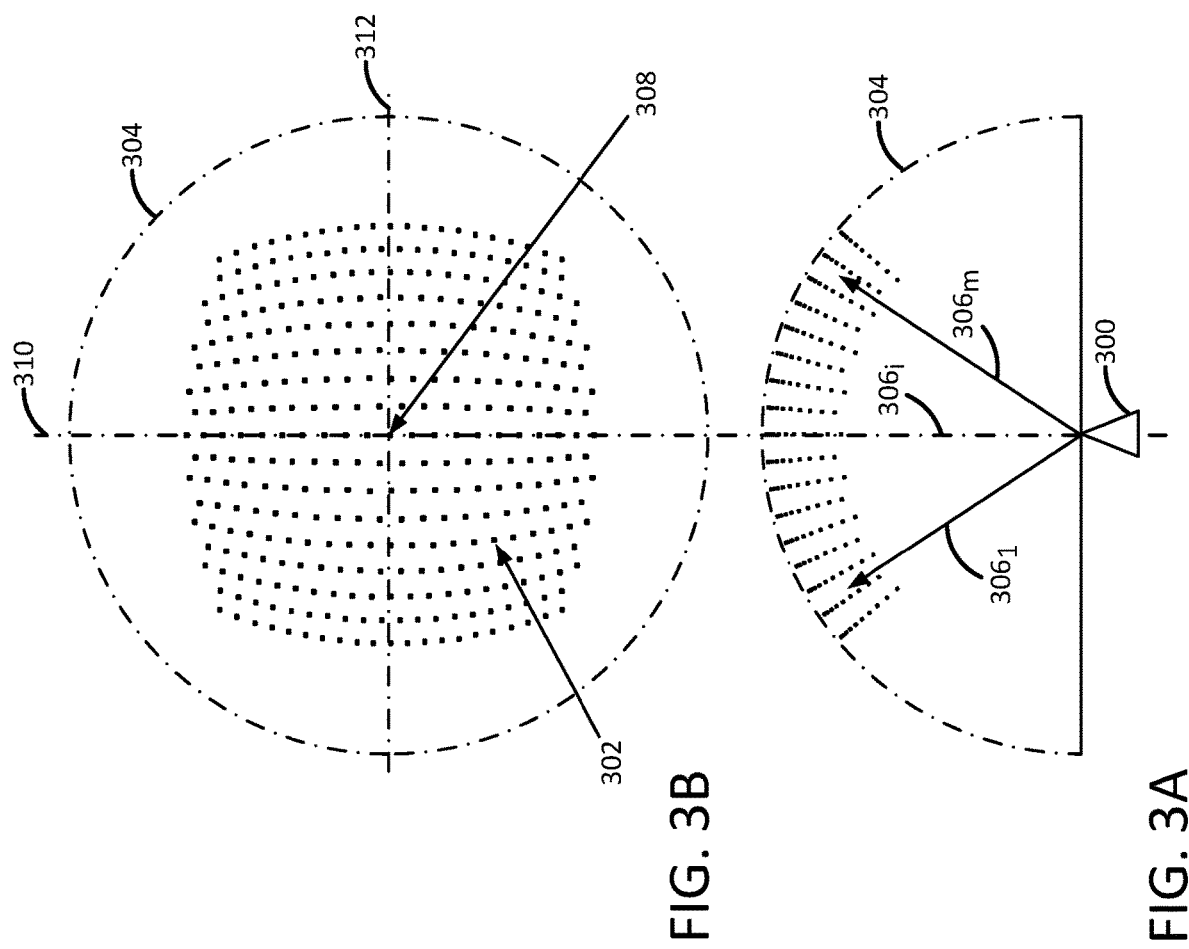
FIG. 3B
FIG. 3A

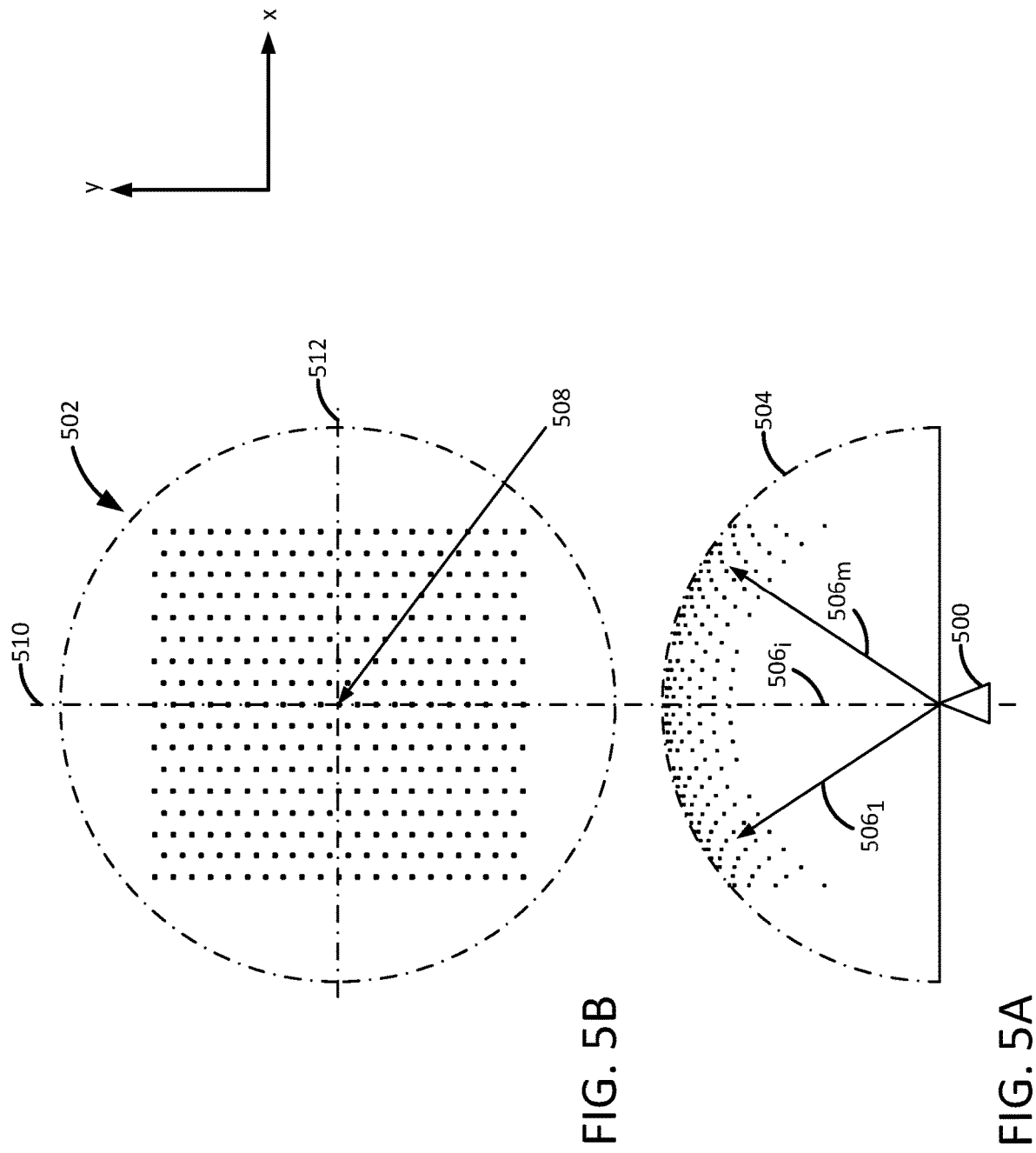

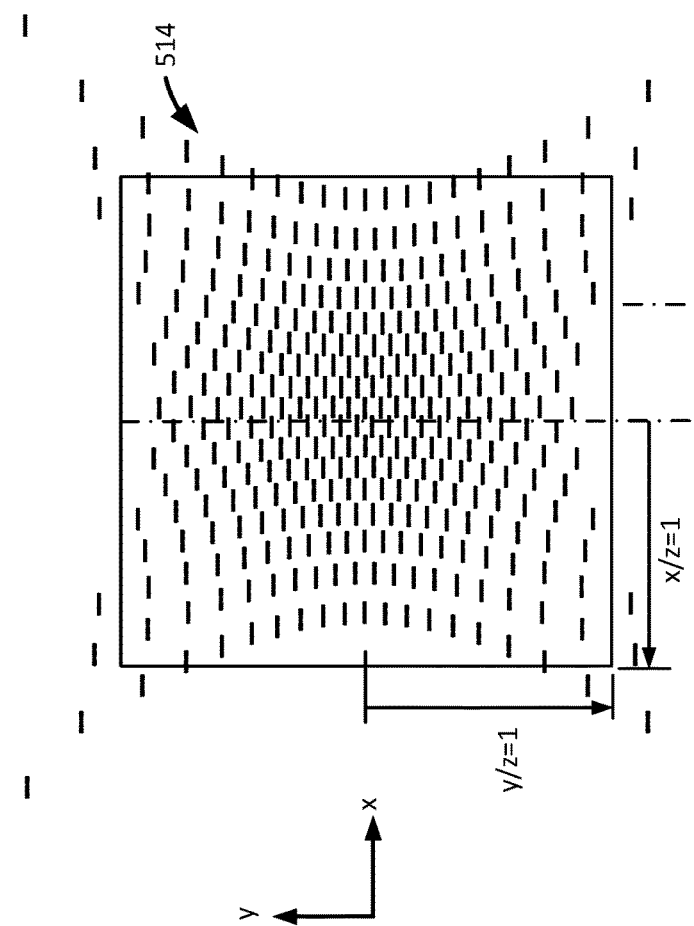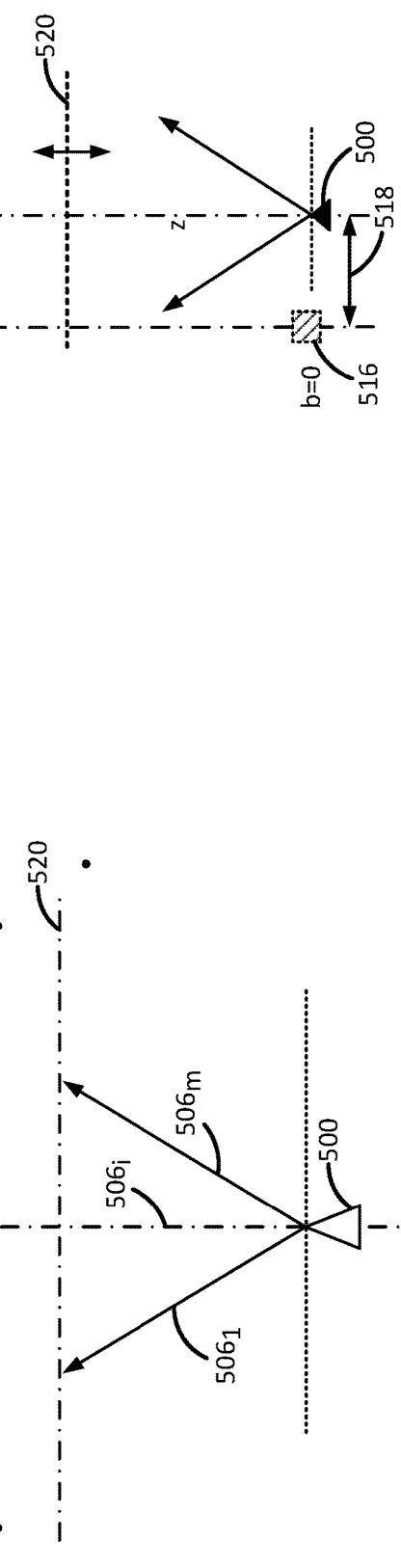
FIG. 5D
FIG. 5C
FIG. 5E

US 11,199,397 B2

DISTANCE MEASUREMENT USING A LONGITUDINAL GRID PATTERN

CROSS REFERENCE TO RELATED APPLICATIONS

This application claims the priority of U.S. Provisional Patent Application Ser. No. 62/569,543, filed Oct. 8, 2017, which is herein incorporated by reference in its entirety.

BACKGROUND

U.S. patent applications Ser. Nos. 14/920,246, 15/149,323, and 15/149,429 describe various configurations of distance sensors. Such distance sensors may be useful in a variety of applications, including security, gaming, control of unmanned vehicles, and other applications.

The distance sensors described in these applications include light sources (e.g., lasers), diffractive optical elements, and/or other components which cooperate to project beams of light that create a pattern (e.g., a pattern of dots, dashes, or other artifacts) in a field of view. When the pattern is incident upon an object in the field of view, the distance from the sensor to the object can be calculated based on the appearance of the pattern (e.g., the positional relationships of the dots, dashes, or other artifacts) in one or more images of the field of view. The shape and dimensions of the object can also be determined.

SUMMARY

In an example, a method includes projecting a projection pattern onto a surface of an object from a projection point of a distance sensor, wherein the projection pattern is created by a plurality of beams of light projected from the projection point, wherein the plurality of beams of light creates a plurality of projection artifacts that is arranged in a grid on the surface of the object, and wherein a center projection artifact of the plurality of projection artifacts lies at an intersection of a longitude line of the grid and a latitude line of the grid, adjusting a projection of the plurality of beams so that at least one of the longitude line and the latitude line is rotated by a predetermined amount from an original position to a new position, resulting in an adjusted projection pattern being projected onto the surface of the object, capturing an image of the object, including at least a portion of the adjusted projection pattern, and calculating a distance from the distance sensor to the object using information from the image.

In another example, a non-transitory machine-readable storage medium is encoded with instructions executable by a processor, wherein, when executed, the instructions cause the processor to perform operations. The operations include projecting a projection pattern onto a surface of an object from a projection point of a distance sensor, wherein the projection pattern is created by a plurality of beams of light projected from the projection point, wherein the plurality of beams of light creates a plurality of projection artifacts that is arranged in a grid on the surface of the object, and wherein a center projection artifact of the plurality of projection artifacts lies at an intersection of a longitude line of the grid and a latitude line of the grid, adjusting a projection of the plurality of beams so that at least one of the longitude line and the latitude line is rotated by a predetermined amount from an original position to a new position, resulting in an adjusted projection pattern being projected onto the surface of the object, capturing an image of the object, including at least a portion of the adjusted projection pattern, and calculating a distance from the distance sensor to the object using information from the image.

BRIEF DESCRIPTION OF THE DRAWINGS

FIG. 1 is a schematic diagram illustrating elements of a distance sensor;

FIG. 2 illustrates the trajectories for a plurality of dots that are part of an example pattern projected by a projection point of a distance sensor;

FIG. 3A illustrates a side view of one example of an arrangement of beams projected from a projection point;

FIG. 3B illustrates a head-on view of the projection pattern created by the arrangement of beams of FIG. 3A;

FIG. 3C illustrates a simplified isometric view of the projection pattern illustrated in FIGS. 3A and 3B;

FIG. 5A illustrates a side view of one example of an arrangement of beams projected from a projection point;

FIG. 5B illustrates a head-on view of the projection pattern created by the arrangement of beams of FIG. 5A;

FIG. 5C illustrates a side view of the projection pattern of FIGS. 5A and 5B projected onto a flat surface;

FIG. 5D illustrates a head-on view of the projection pattern of FIGS. 5A and 5B projected onto a flat surface;

FIG. 5E illustrates a head-on view of the trajectories of the projection artifacts of FIGS. 5A-5D when the pattern of FIGS. 5A-5D is projected onto the flat surface;

DETAILED DESCRIPTION

Figure 3D:
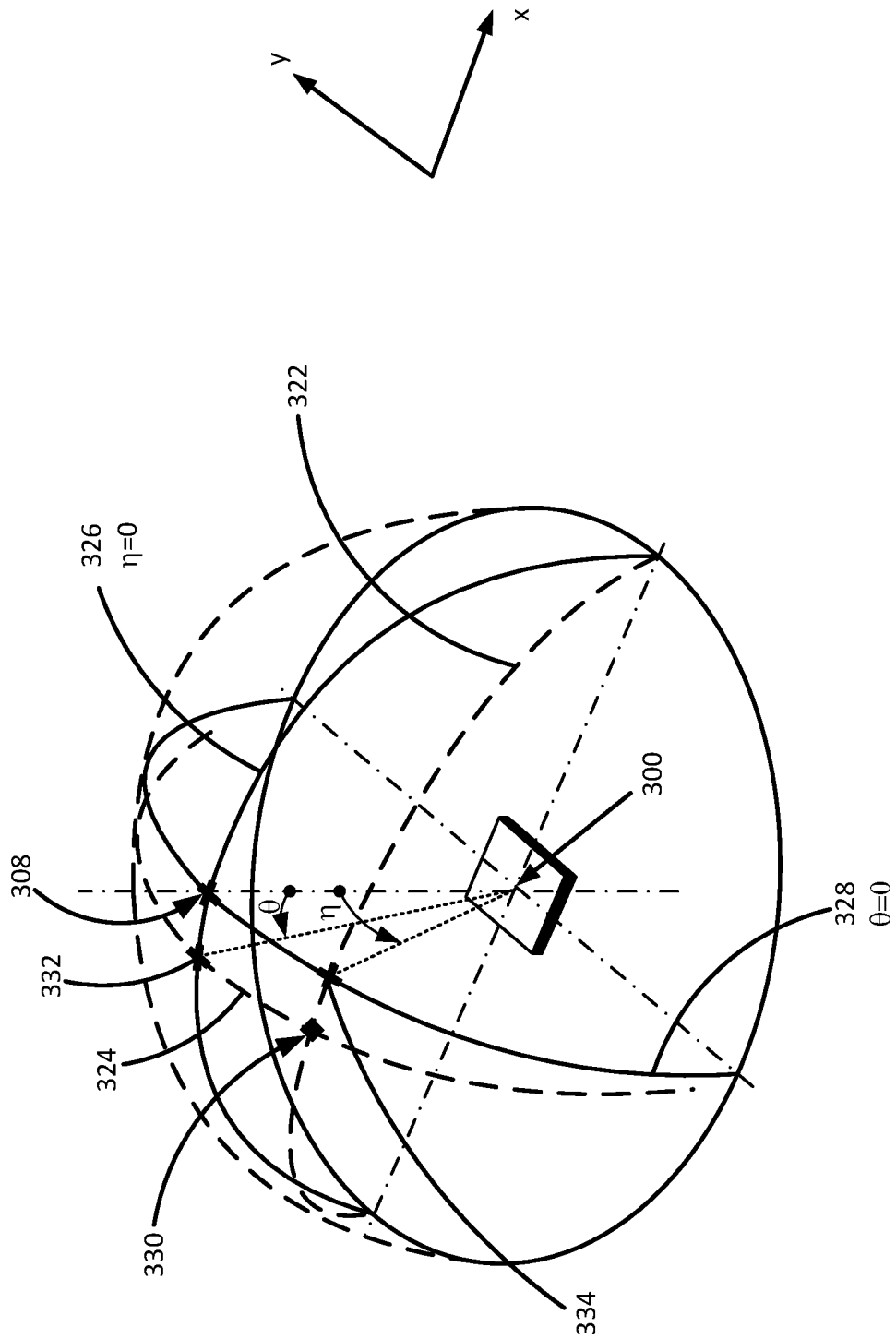
FIG. 3D illustrates the general shape of the projection pattern of FIGS. 3A-3C in a hemispherical field of view.

The present disclosure broadly describes an apparatus, method, and non-transitory computer-readable medium for distance measurement using a longitudinal grid pattern. As discussed above, distance sensors such as those described in U.S. patent applications Ser. Nos. 14/920,246, 15/149,323, and 15/149,429 determine the distance to an object (and, potentially, the shape and dimensions of the object) by projecting beams of light that create a pattern (e.g., a pattern of dots, dashes, or other artifacts) in a field of view that includes the object. In some examples, the sensors include multiple "projection points," where a plurality of beams may be projected from each projection point. The plurality of beams may fan out to form a portion of the pattern. The appearance of the pattern may change with the distance to an object. For instance, if the pattern comprises a pattern of dots, the dots may appear closer to each other when the object is closer to the sensor, and may appear further away from each other when the object is further away from the sensor.

FIG. 1, for example, is a schematic diagram illustrating elements of a distance sensor similar to the sensors described in U.S. patent applications Ser. Nos. 14/920,246, 15/149,323, and 15/149,429. As illustrated, a sensor may include a lens 100 of an image capturing device. The field of view of the lens 100 may be denoted by f. The sensor may also include a plurality of projection points (e.g., formed by a combination of light sources, diffractive optical elements, and/or other components) arranged around the perimeter of the lens 100; FIG. 1 illustrates one such projection point 102, where other projection points may be similarly configured and placed at different positions around the lens 100. The distance d from the central axis of the lens 100 to the central axis of the projection point 102 may also be referred to as a "baseline" of the sensor.

The projection point 102 projects a plurality of beams $104_1$-$104_n$ (hereinafter individually referred to as a "beam 104" or collectively referred to as "beams 104") of light, which fan out and form a pattern 106 of projection artifacts (e.g., dots, dashes, or the like) when the beams 104 are incident upon a surface. The plane of the pattern 106 may be parallel to the baseline d of the sensor. In the example illustrated in FIG. 1, the projection artifacts are dots. FIG. 1 illustrates the pattern 106 as it appears at a first distance D1 from the baseline d and also as it appears at a second distance D2 from the baseline d.

All beams 104 projected from the same projection point 102 will move in the same direction along the baseline d, according to object distance as described above. However, as the number of beams 104 projected from the same projection point 102 increases, the trajectories (i.e., moving ranges) of the artifacts (e.g., dots) produced by the beams 104 may appear closer together and may, in some cases, even overlap.

The trajectory of a projection artifact is determined by the positional relationship between the distance sensor's projection optical system (e.g., the set of optics, including light sources, diffractive optical elements, and other components that projects the beams of light) and the light receiving optical system (e.g., the lens, image capturing device, and other components that capture images of the projection artifacts) in the planar (e.g., lateral) direction and the height direction (e.g., the direction perpendicular to the lateral direction). The trajectory of a projection artifact may appear as a radial pattern or a line and describes the movement of the projection artifact as the distance between the sensor and an object into which the projection pattern is projected varies. More specifically, the trajectory of a projection artifact describes the projection artifact's movement relative to the distance sensor's image capturing device with variations in distance.

FIG. 2, for instance, illustrates the trajectories 200 for a plurality of dots that are part of an example pattern projected by a projection point of a distance sensor (e.g., such as projection point 102 of FIG. 1). The unshaded dots represent the locations of the dots at a first distance from the sensor baseline, while the shaded dots represent the locations of the dots at a second distance from the sensor baseline. A line or trajectory 200 connecting an unshaded dot to a shaded dot represents that the unshaded dot and the shaded dot are the same dot, depicted at different distances from the sensor baseline. As shown in FIG. 2, the trajectories 200 of some of the dots may overlap. Overlapping trajectories 200 are shown by the circles 202. When overlap of trajectories 200 occurs, it may be difficult to determine which beams projected from the projection points correspond to which dots in the projection pattern. This, in turn, may complicate the distance measurement calculations, as accurate calculations may rely on the ability to identify the beams that created the dots that are visible in an image.

Thus, an increase in the number of beams projected from a projection point of a distance sensor may increase the likelihood that there will be overlap in the trajectories of the projection artifacts created by the beams (and therefor increase the difficulty of the distance calculations). On the other hand, a large number of beams is generally considered advantageous because it provides better spatial coverage of the sensor's field of view for distance calculation purposes. As an additional consideration, it may be desirable to keep the number of projection points to a minimum in order to minimize manufacturing costs, sensor size, and sensor failure due to component damage. To maintain spatial coverage with fewer projection points, though, it may be necessary to project a greater number of beams from the projection points.

Examples of the present disclosure provide a beam arrangement for a distance sensor that minimizes the overlap of projection artifact trajectories as the number of beams projected from the sensor projection points increases. In particular, examples of the disclosure provide patterns having a distribution of projection artifacts that balances the need for spatial coverage with the need to minimize overlap of projection artifact trajectories. Examples of the disclosed patterns may be achieved by projecting, from each projection point, a plurality of beams that fans out symmetrically (in at least the x and y directions) from a center beam.

As discussed above, the trajectory of a projection artifact may appear as a radial pattern or a line. Examples of the present disclosure consider the fact that both the projection artifact trajectory and the lines of a projection pattern including a plurality of projection artifacts may appear to be linear. As such, the positional relationship between the projection artifact and the image capturing device of the distance sensor, the direction of the center projection artifact, or the rotational phase of the projection pattern created by a plurality of projection artifacts can be adjusted to minimize the overlaps in the trajectories of a plurality of projection artifacts forming a projection pattern. Further examples of the present disclosure account for the fact that when the plane that forms the projection pattern is curved, the angle formed by a projection artifact trajectory and the lines of the projection pattern may change gradually, which makes uniform elimination of trajectory overlap over the entire projection pattern more challenging.

Examples of the present disclosure describe a projection pattern (i.e., a pattern created by a plurality of projection artifacts) that has a generally rectangular shape, where the projection artifacts are arranged in a plurality of rows and columns. In this context, the projection artifact that lies in the center of the projection pattern may be considered the "origin" of the projection pattern. The row that intersects the origin may be referred to as the "latitude" line of the projection pattern, while the column that intersects the origin may be referred to as the "longitude" line of the projection pattern. Further examples of the present disclosure may adjust the angle of projection of one or more beams from a projection point so that one or more of the latitude and longitude lines of a projection pattern is rotated by a predetermined angle to achieve an adjusted projection pattern that minimizes overlap of projection artifact trajectories.

FIG. 3A illustrates a side view of one example of an arrangement of beams projected from a projection point 300, while FIG. 3B illustrates a head-on view of the projection pattern 302 created by the arrangement of beams of FIG. 3A. In the example of FIGS. 3A and 3B, the arrangement of beams is projected onto a spherical surface 304, i.e., a surface having a rounded (non-flat) shape.

As illustrated, the projection point 300 projects a plurality of beams $306_1$-$306_m$ (hereinafter individually referred to as a "beam 306" or collectively referred to as "beams 306"). The plurality of beams 306 includes a center beam $306_i$. The remaining beams 306 fan out from the center beam $306_i$ in both directions along the x axis and in both direction along the y axis. In order to simplify the drawings, the beams 306 that may reside between the first beam $306_1$ and the center beam $306_i$, and between the center beam $306_i$ and the last beam $306_m$, are not illustrated in FIG. 3A.

The resultant pattern 302 created by the plurality of beams 306 comprises a plurality of projection artifacts (e.g., dots) arranged in a rectangular grid, as shown in FIG. 3B. Rows of the grid extend along the x axis of the illustrated coordinate system, while columns of the grid extend along the y axis. The rows and columns are arranged in an azimuth corresponding to the x axis and y axis from the center beam $306_i$ at intervals according to a predefined rule (e.g., equal angular intervals, equal sine value intervals, etc.).

The projection artifacts may be arranged in a staggered pattern (e.g., where each row or column is offset from the adjacent rows or columns, so that all projection artifacts along a row or along a column may not be collinear) or in a continuous pattern (e.g., where each row or column is aligned with the adjacent rows or columns, so that all projection artifacts along a row or along a column are collinear). Whether the pattern of projection artifacts is staggered or continuous, the pattern is regular (i.e., the placement of projection artifacts is regular rather than random) and may extend outward from a center projection artifact 308 created by the center beam $306_i$. The center projection artifact 308 lies at the intersection of a "longitude line" 310 (or central column) and a "latitude line" 312 (or center row) and may be considered the "origin" of the pattern 302.

In one example, when the pattern 302 is being projected onto a spherical surface 304, the longitude line 310 may be rotated by a first predetermined angle around the y axis. Alternatively or in addition, the latitude line 312 may be rotated by a second predetermined angle around the x axis. This is shown in FIG. 3B, where the shape of the pattern 302 curves to confirm to the rounded shape of the spherical surface 304.

Since the spherical surface 304 onto which the central projection artifact 308, the rotated longitude line 310, and/or rotated latitude line 312 are projected is always a plane, each row or column of the pattern 302 will comprise a plane that passes through the central projection artifact 308. As shown in FIG. 3C, which illustrates a simplified, isometric view of the projection pattern 302 illustrated in FIGS. 3A and 3B, each line of projection artifacts that is projected onto the plane of the spherical surface 304 will become a straight line.

In the example illustrated in FIG. 3C, the surface formed by the projection point 300 and the latitude line of the pattern 302 is conical (with the projection point 300 as the summit or narrow end of the cone), while the surface formed by the projection point 300 and the longitude line of the pattern 302 is a flat or planar surface. This is why the grid lines formed by the projection points become curved lines. Grid lines arranged on the longitude line are straight lines, while rectangular shapes (angles formed by respective lines) are uniform with respect to the difference of a three-dimensional position. In one example, the distance from the distance sensor to an object, according to the example projection pattern 302, corresponds to the radius of the spherical surface 304 centered on the principal point of the lens of the distance sensor. The sensor may be positioned in the center of a plurality of projection points including the projection point 300, and the principal point may be the front nodal point of the sensor's lens.

FIG. 3D illustrates the general shape of the projection pattern 302 of FIGS. 3A-3C in a hemispherical field of view. More specifically, FIG. 3D illustrates the orientations of the projection pattern's grid lines relative to the projection point 300. As illustrated, the projection pattern 302 may be adjusted by rotating one or more of the latitude line 326 and the longitude line 328 by predetermined angles $\eta$ and $\theta$, respectively. $\eta$ and $\theta$ may be equal or unequal, depending upon the application and the shape of the object onto which the projection pattern 302 is to be projected.

For instance, the latitude line 326 may be shifted in the y direction (i.e., in a direction along the y axis) to a new position 322. In one example, the shift of the latitude line 326 to the new position 322 is accomplished by rotating the latitude line 326 by an angle of $\eta$.

The longitude line 328 may be shifted in the x direction (i.e., in a direction along the x axis) to a new position 324. In one example, the shift of the longitude line 328 to the new position 324 is accomplished by rotating the longitude line 328 by an angle of $\theta$.

FIG. 3D illustrates a few of the example projection artifacts that may be created by this beam layout. In addition to the center projection artifact 308, which lies at an intersection of the original positions of the latitude line 326 (for which $\eta$=0) and the longitude line 328 (for which $\theta$=0), the following projection artifacts are also shown: projection artifact 330, which lies at coordinates of ($\theta$, $\eta$) from the center projection artifact 308 (e.g., is shifted in both the x and y directions) and represents a new position of the center projection artifact 308 in the adjusted pattern; projection artifact 332, which lies at coordinates ($\theta$, 0); and projection artifact 334, which lies at coordinates (0, $\eta$).

Figure 4B:
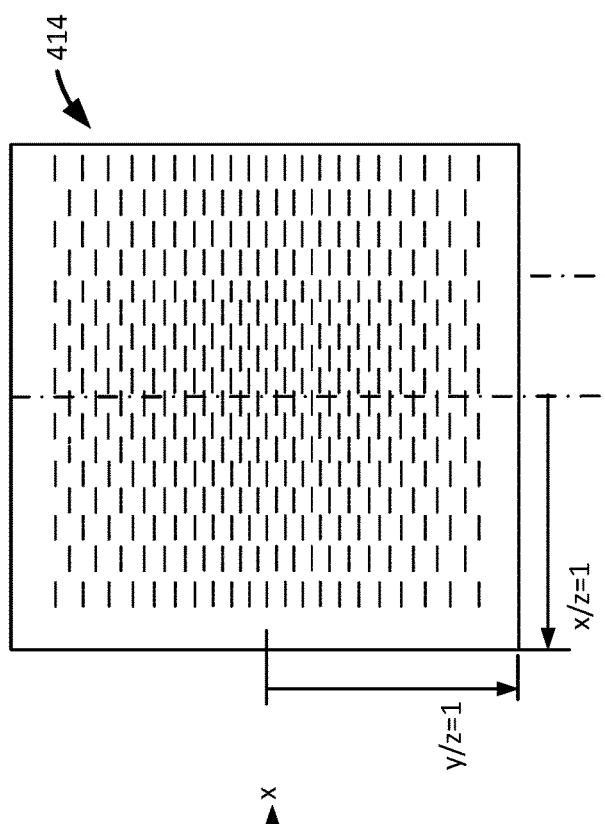
FIG. 4B illustrates a head-on view of the projection pattern 402 created by the arrangement of beams of FIG. 4A.
Figure 4C:
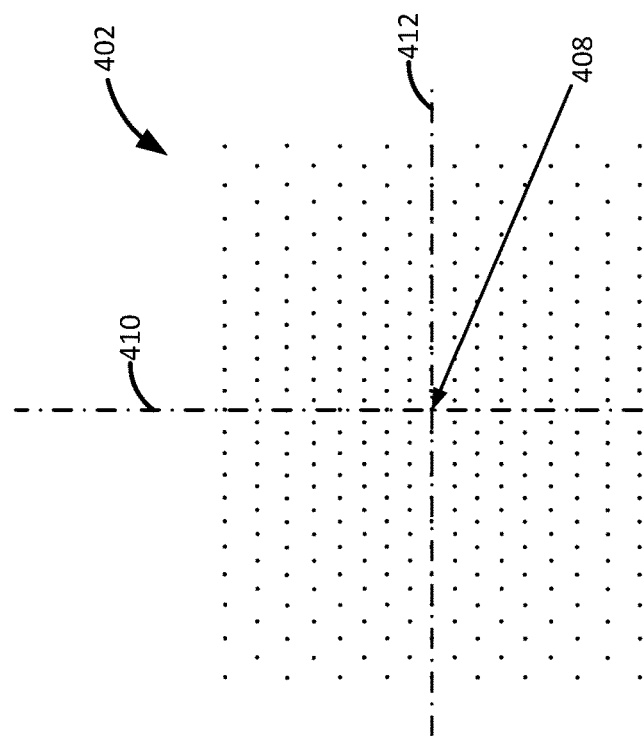
FIG. 4C illustrates a head-on view of the trajectories of the projection artifacts of FIGS. 4A and 4B when the pattern of FIGS. 4A and 4B is projected onto the flat surface.
Figure 4A:
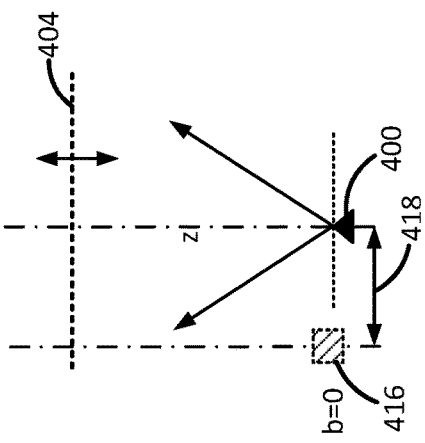
FIG. 4A illustrates a side view of one example of an arrangement of beams projected from a projection point.

FIG. 4A illustrates a side view of one example of an arrangement of beams projected from a projection point 400, while FIG. 4B illustrates a head-on view of the projection pattern 402 created by the arrangement of beams of FIG. 4A. In the example of FIGS. 4A and 4B, the arrangement of beams is projected onto a flat surface 404.

As illustrated, the projection point 400 projects a plurality of beams $406_1$-$406_m$ (hereinafter individually referred to as a "beam 406" or collectively referred to as "beams 406"). The plurality of beams 406 includes a center beam $406_i$. The remaining beams 406 fan out from the center beam $406_i$ in both directions along the x axis and in both direction along the y axis. In order to simplify the drawings, the beams 406 that may reside between the first beam $406_1$ and the center beam $406_i$, and between the center beam $406_i$ and the last beam $406_m$, are not illustrated in FIG. 4A.

The resultant pattern 402 created by the plurality of beams 406 comprises a plurality of projection artifacts (e.g., dots) arranged in a rectangular grid, as shown in FIG. 4B. Rows of the grid extend along the x axis of the illustrated coordinate system, while columns of the grid extend along the y axis. The rows and columns are arranged in an azimuth corresponding to the x axis and y axis from the center beam $406_i$, at intervals according to a predefined rule (e.g., equal angular intervals, equal sine value intervals, etc.).

The projection artifacts may be arranged in a staggered pattern (e.g., where each row or column is offset from the adjacent rows or columns, so that all projection artifacts along a row or along a column may not be collinear) or in a continuous pattern (e.g., where each row or column is aligned with the adjacent rows or columns, so that all projection artifacts along a row or along a column are collinear). Whether the pattern of projection artifacts is staggered or continuous, the pattern is regular (i.e., the placement of projection artifacts is regular rather than random) may extend outward from a center projection artifact 408 created by the center beam $406_i$. The center projection artifact 408 lies at the intersection of a longitude line 410 and a latitude line 412 and may be considered the "origin" of the pattern 402.

FIG. 4C illustrates a head-on view of the trajectories 414 of the projection artifacts of FIGS. 4A and 4B when the pattern 402 of FIGS. 4A and 4B is projected onto the flat surface 404. As illustrated, the trajectories 414 do not overlap.

FIG. 4C also shows a position of the lens 416 in relation to the projection point 400. As shown by the baseline 418, the projection point 400 is positioned some distance a in the radial or x direction from the lens 416. However, in the y direction, there is zero difference between the position of the projection point 416 and the lens. In other words, the lens 416 and the projection point 400 may be mounted in the same plane, e.g., such that the projection point 400 is level with the principal point (e.g., front nodal point) of the lens's image capturing device in the direction of the image capturing device's optical axis.

FIG. 5A illustrates a side view of one example of an arrangement of beams projected from a projection point 500, while FIG. 5B illustrates a head-on view of the projection pattern 502 created by the arrangement of beams of FIG. 5A. In the example of FIGS. 5A and 5B, the arrangement of beams is projected onto a spherical surface 504, i.e., a surface having a rounded (non-flat) shape.

As illustrated, the projection point 500 projects a plurality of beams $506_1$-$506_m$ (hereinafter individually referred to as a "beam 506" or collectively referred to as "beams 506"). The plurality of beams 506 includes a center beam $506_i$. The remaining beams 506 fan out from the center beam $506_i$ in both directions along the x axis and in both direction along the y axis. In order to simplify the drawings, the beams 506 that may reside between the first beam $506_1$ and the center beam $506_i$, and between the center beam $506_i$ and the last beam $506_m$, are not illustrated in FIG. 5A.

The resultant pattern 502 created by the plurality of beams 506 comprises a plurality of projection artifacts (e.g., dots) arranged in a rectangular grid, as shown in FIG. 5B. Rows of the grid extend along the x axis of the illustrated coordinate system, while columns of the grid extend along the y axis. The rows and columns are arranged in an azimuth corresponding to the x axis and y axis from the center beam $506_i$, at intervals according to a predefined rule (e.g., equal angular intervals, equal sine value intervals, etc.).

The projection artifacts may be arranged in a staggered pattern (e.g., where each row or column is offset from the adjacent rows or columns, so that all projection artifacts along a row or along a column may not be collinear) or in a continuous pattern (e.g., where each row or column is aligned with the adjacent rows or columns, so that all projection artifacts along a row or along a column are collinear). Whether the pattern of projection artifacts is staggered or continuous, the pattern is regular (i.e., the placement of projection artifacts is regular rather than random) may extend outward from a center projection artifact 508 created by the center beam $506_i$. The center projection artifact 508 lies at the intersection of a longitude line 510 and a latitude line 512 and may be considered the "origin" of the pattern 502.

FIG. 5C illustrates a side view of the projection pattern 502 of FIGS. 5A and 5B projected onto a flat surface 516, while FIG. 5D illustrates a head-on view of the projection pattern 502 of FIGS. 5A and 5B projected onto the flat surface 516. As illustrated in FIG. 5C, unlike when the pattern 502 is projected onto the flat surface 516, the pattern 502 bends. As discussed in connection with FIG. 5E, below, this may cause the trajectories of the projection artifacts to overlap. This stands in contrast to the example of FIGS. 5A and 5B, where the pattern 502 is projected onto the spherical surface 504 and maintains its generally rectangular grid shape.

FIG. 5E illustrates a head-on view of the trajectories 514 of the projection artifacts of FIGS. 5A-5D when the pattern 502 of FIGS. 5A-5D is projected onto the flat surface 520. As illustrated, the trajectories 514 overlap when projected onto the flat surface 520.

FIG. 5E also shows a position of the lens 516 in relation to the projection point 500. As shown by the baseline 518, the projection point 500 is positioned some distance a in the radial or x direction from the lens 516. However, in the y direction, there is zero difference between the position of the projection point 500 and the lens 516. In other words, the lens 516 and the projection point 500 may be mounted in the same plane, e.g., such that the projection point 500 is level with the principal point (e.g., front nodal point) of the lens's image capturing device in the direction of the image capturing device's optical axis.

Figure 5F:
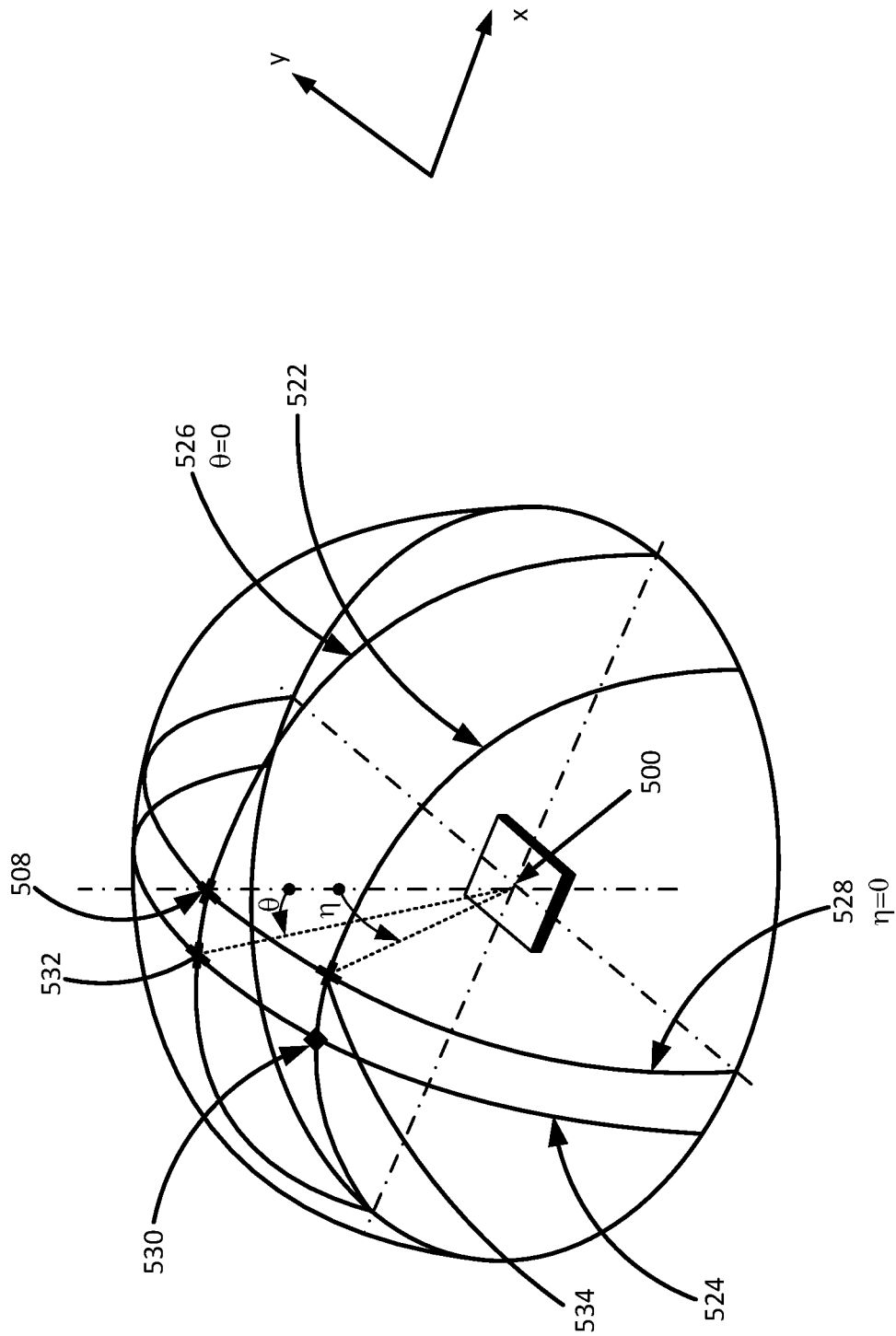
FIG. 5F illustrates the general shape of the projection pattern of FIGS. 5A-5E in a hemispherical field of view.

FIG. 5F illustrates the general shape of the projection pattern 502 of FIGS. 5A-5E in a hemispherical field of view. More specifically, FIG. 5F illustrates the orientations of the projection pattern's grid lines relative to the projection point 500. As illustrated, the projection pattern 502 may be adjusted by rotating one or more of the latitude line 526 and the longitude line 528 by predetermined angles η and θ, respectively. η and θ may be equal or unequal, depending upon the application and the shape of the object onto which the projection pattern 502 is to be projected.

For instance, the latitude line 526 may be shifted in the y direction (i.e., in a direction along the y axis) to a new position 522. In one example, the shift of the latitude line 526 to the new position 522 is accomplished by rotating the latitude line 526 by an angle of η.

The longitude line 528 may be shifted in the x direction (i.e., in a direction along the x axis) to a new position 524. In one example, the shift of the longitude line 528 to the new position 524 is accomplished by rotating the longitude line 528 by an angle of θ.

FIG. 5F illustrates a few of the example projection artifacts that may be created by this beam layout. In addition to the center projection artifact 508, which lies at an intersection of the original positions of the latitude line 526 (for which θ=0) and the longitude line 528 (for which η=0), the following projection artifacts are also shown: projection artifact 530, which lies at coordinates of (θ, η) from the center projection artifact 508 (e.g., is shifted in both the x and y directions) and represents a new position of the center projection artifact 508 in the adjusted pattern; projection artifact 532, which lies at coordinates (0, η), and projection artifact 534, which lies at coordinates (θ, 0).

Figures 6A, 6B:
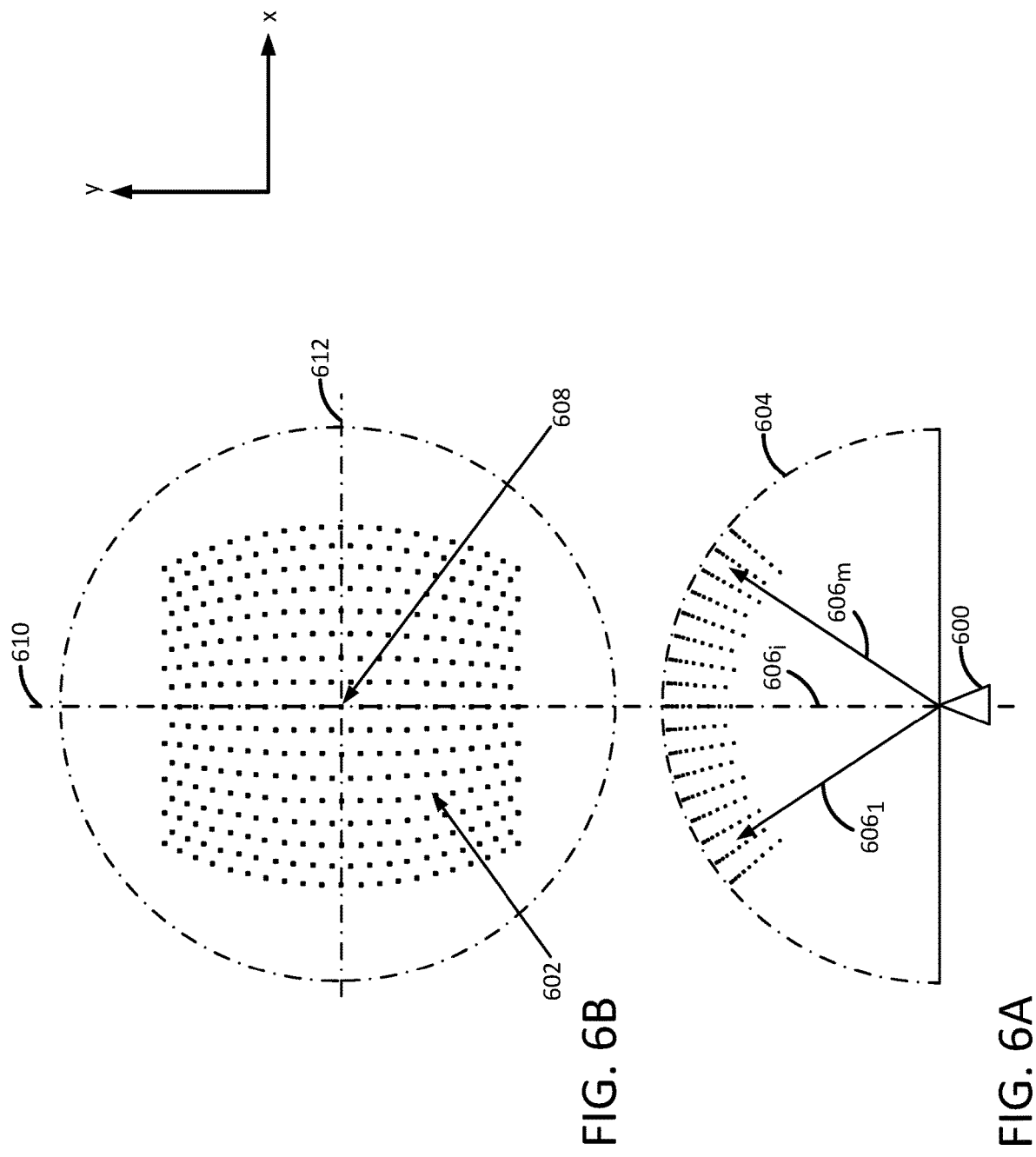
FIG. 6A illustrates a side view of one example of an arrangement of beams projected from a projection point.
FIG. 6B illustrates a head-on view of the projection pattern created by the arrangement of beams of FIG. 6A.

FIG. 6A illustrates a side view of one example of an arrangement of beams projected from a projection point 600, while FIG. 6B illustrates a head-on view of the projection pattern 602 created by the arrangement of beams of FIG. 6A. In the example of FIGS. 6A and 6B, the arrangement of beams is projected onto a spherical surface 604, i.e., a surface having a rounded (non-flat) shape.

As illustrated, the projection point 600 projects a plurality of beams $606_1$-$606_m$ (hereinafter individually referred to as a "beam 606" or collectively referred to as "beams 606"). The plurality of beams 606 includes a center beam $606_i$. The remaining beams 606 fan out from the center beam $606_i$ in both directions along the x axis and in both direction along the y axis. In order to simplify the drawings, the beams 606 that may reside between the first beam $606_1$ and the center beam $606_i$, and between the center beam $606_i$ and the last beam $606_m$, are not illustrated in FIG. 6A.

The resultant pattern 602 created by the plurality of beams 606 comprises a plurality of projection artifacts (e.g., dots) arranged in a rectangular grid, as shown in FIG. 6B. Rows of the grid extend along the x axis of the illustrated coordinate system, while columns of the grid extend along the y axis. The rows and columns are arranged in an azimuth corresponding to the x axis and y axis from the center beam $606_i$ at intervals according to a predefined rule (e.g., equal angular intervals, equal sine value intervals, etc.).

The projection artifacts may be arranged in a staggered pattern (e.g., where each row or column is offset from the adjacent rows or columns, so that all projection artifacts along a row or along a column may not be collinear) or in a continuous pattern (e.g., where each row or column is aligned with the adjacent rows or columns, so that all projection artifacts along a row or along a column are collinear).

Whether the pattern of projection artifacts is staggered or continuous, the pattern is regular (i.e., the placement of projection artifacts is regular rather than random) may extend outward from a center projection artifact 608 created by the center beam $606_i$. The center projection artifact 608 lies at the intersection of a longitude line 610 and a latitude line 612 and may be considered the "origin" of the pattern 602.

In one example, when the pattern 602 is being projected onto a spherical surface 604 centered on the center projection artifact 608, the pattern 602 may take a shape that resembles looking directly at the longitude (e.g., meridian) and latitude (e.g., equator) lines of the Earth from just above the Earth's equator, as shown in FIG. 6B.

Figure 6E:
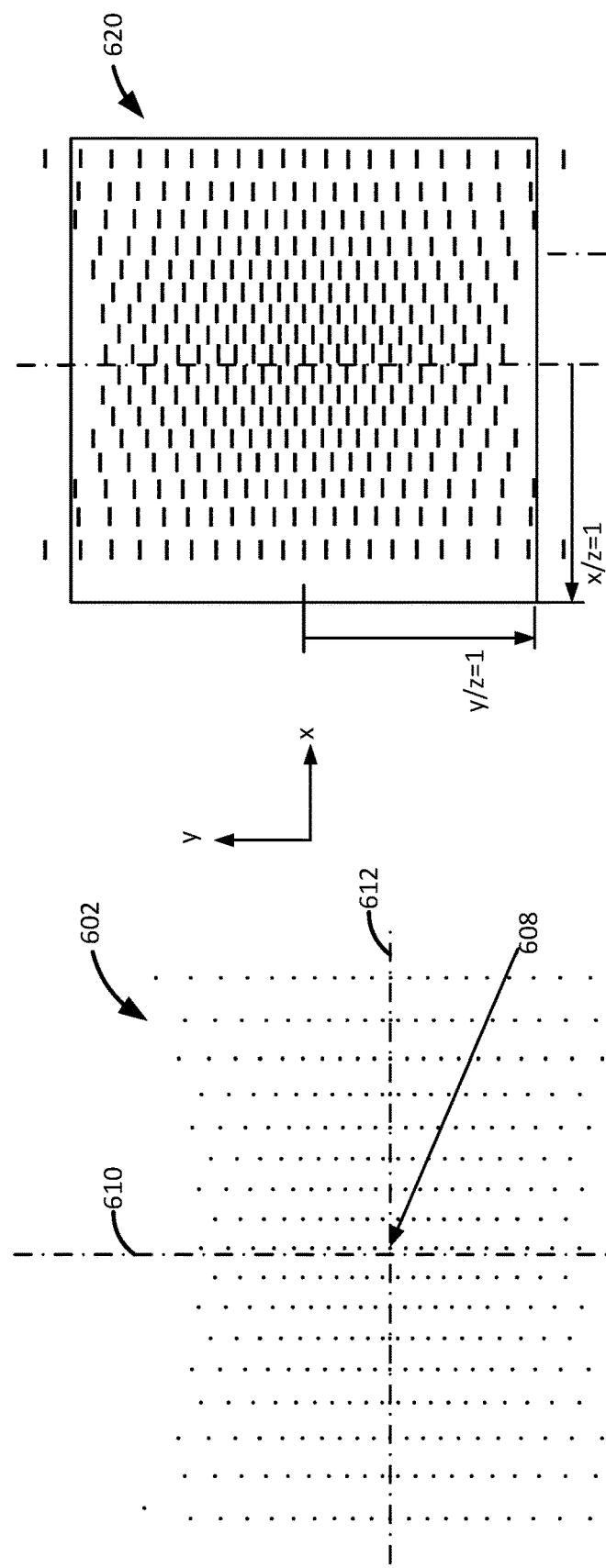
FIG. 6E illustrates a head-on view of the trajectories of the projection artifacts of FIGS. 6A-6D when the pattern of FIGS. 6A-6D is projected onto the flat surface.
Figure 6D:
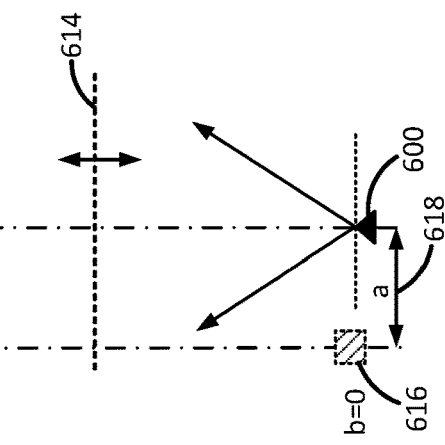
FIG. 6D illustrates a head-on view of the projection pattern of FIGS. 6A and 6B projected onto a flat surface.
Figure 6C:
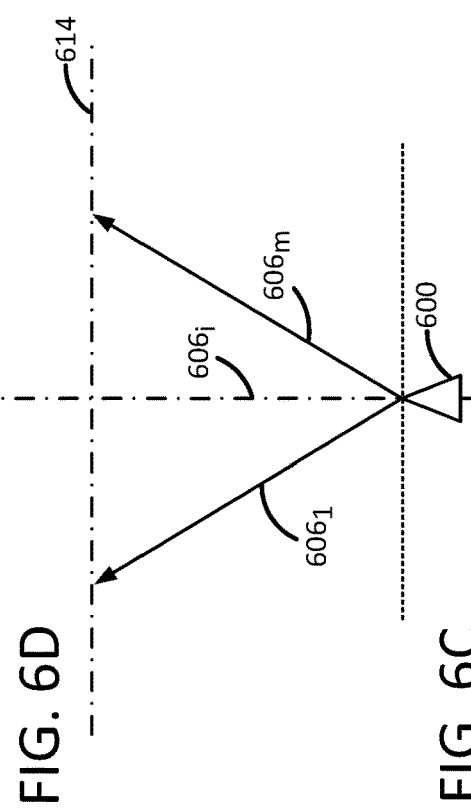
FIG. 6C illustrates a side view of the projection pattern of FIGS. 6A and 6B projected onto a flat surface.

FIG. 6C illustrates a side view of the projection pattern 602 of FIGS. 6A and 6B projected onto a flat surface, while FIG. 6D illustrates a head-on view of the projection pattern 602 of FIGS. 6A and 6B projected onto a flat surface.

FIG. 6E illustrates a head-on view of the trajectories 620 of the projection artifacts of FIGS. 6A-6D when the pattern 602 of FIGS. 6A-6D is projected onto the flat surface 614. As illustrated, the trajectories 620 do not overlap.

FIG. 6E also shows a position of the lens 616 in relation to the projection point 600. As shown by the baseline 618, the projection point 600 is positioned some distance a in the radial or x direction from the lens 616. However, in the y direction, there is zero difference between the position of the projection point 600 and the lens 616. In other words, the lens 616 and the projection point 600 may be mounted in the same plane, e.g., such that the projection point 600 is level with the principal point (e.g., front nodal point) of the lens's image capturing device in the direction of the image capturing device's optical axis.

Figure 7:
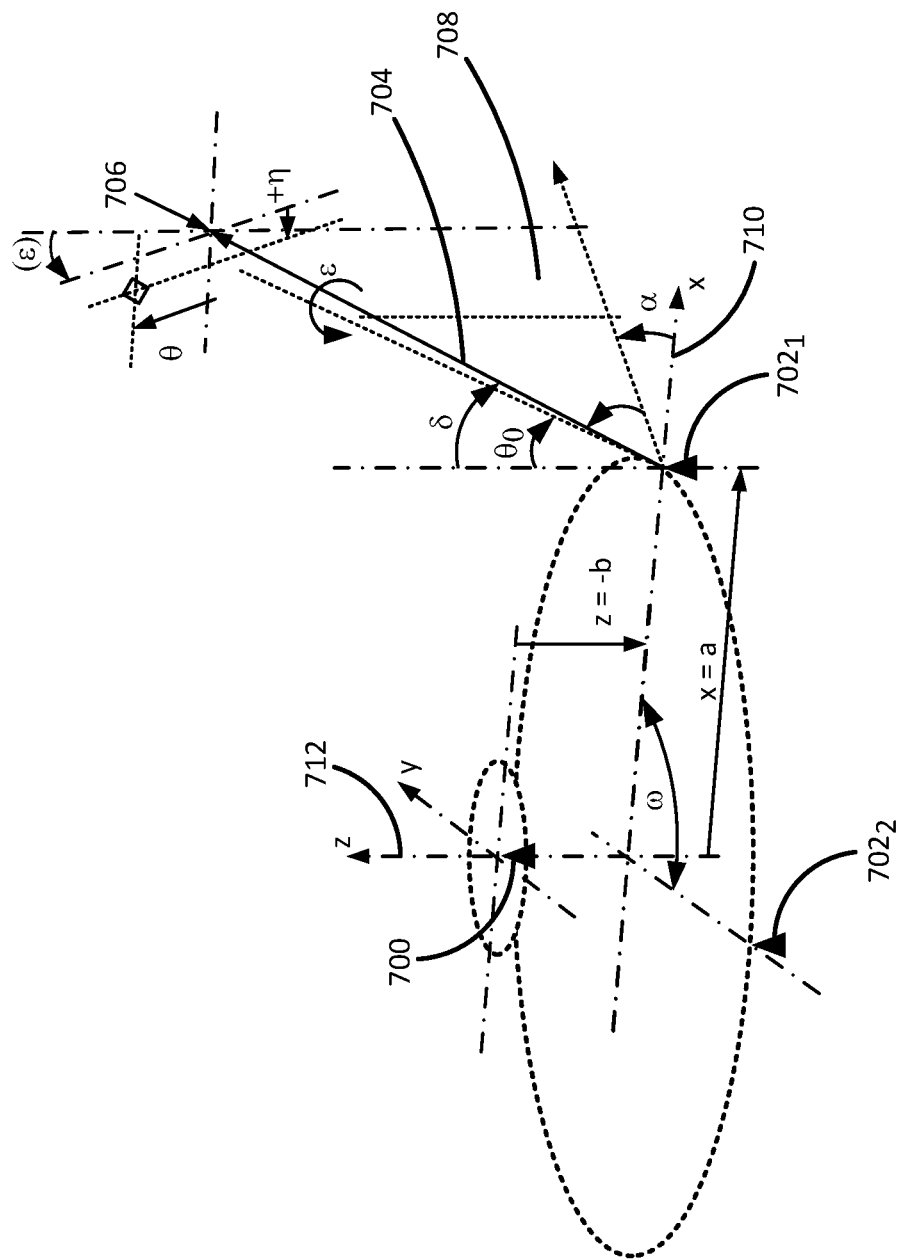
FIG. 7 illustrates an example projection beam alignment of the present disclosure.

FIG. 7 illustrates an example projection beam alignment of the present disclosure. In particular, FIG. 7 illustrates various components of a distance sensor, including the front nodal point 700 of the lens/image capturing device, a first projection point $702_1$, and a second projection point $702_2$.

As illustrated, the front nodal point 700 is positioned a lateral distance (e.g., along the x axis) a from each of the first projection point $702_1$ and the second projection point $702_2$. The first projection point $702_1$ and the second projection point $702_2$ are positioned a distance b behind (e.g., along the z axis) the front nodal point 700. Moreover, an angle of w is defined between the first projection point $702_1$ and the second projection point $702_2$ (and between any other projection points that may be part of the distance sensor).

Taking the first projection point $702_1$ as an example, the first projection point $702_1$ projects a plurality of beams of light, including a center beam 704. For the sake of simplicity, only the center beam 704 is illustrated in FIG. 7. The center beam 704 creates a center projection artifact 706 of a projection pattern that is created by the plurality of beams. For the sake of simplicity, only the center projection artifact 706 is illustrated in FIG. 7.

The orientation of the center beam 704 relative to the first projection point $702_1$ may be described by a plurality of angles. For instance, an angle of a may be defined between a plane 708 defined by the center beam 704 and a radial line 710 passing through the central axis 712 of the front nodal point 700 and the first projection point $702_1$.

A rolling axis c shows how the center beam 706 may be rotated to adjust the position of the center projection artifact 706. The center beam may be rotated by an angle of θ along the y axis and/or by an angle of η along the x axis. Moreover, and angle of δ is defined between the center beam 706 and a line that passes through the first projection point $702_1$ at an angle that is parallel to the central axis 712 of the front nodal point 700.

Figure 8:
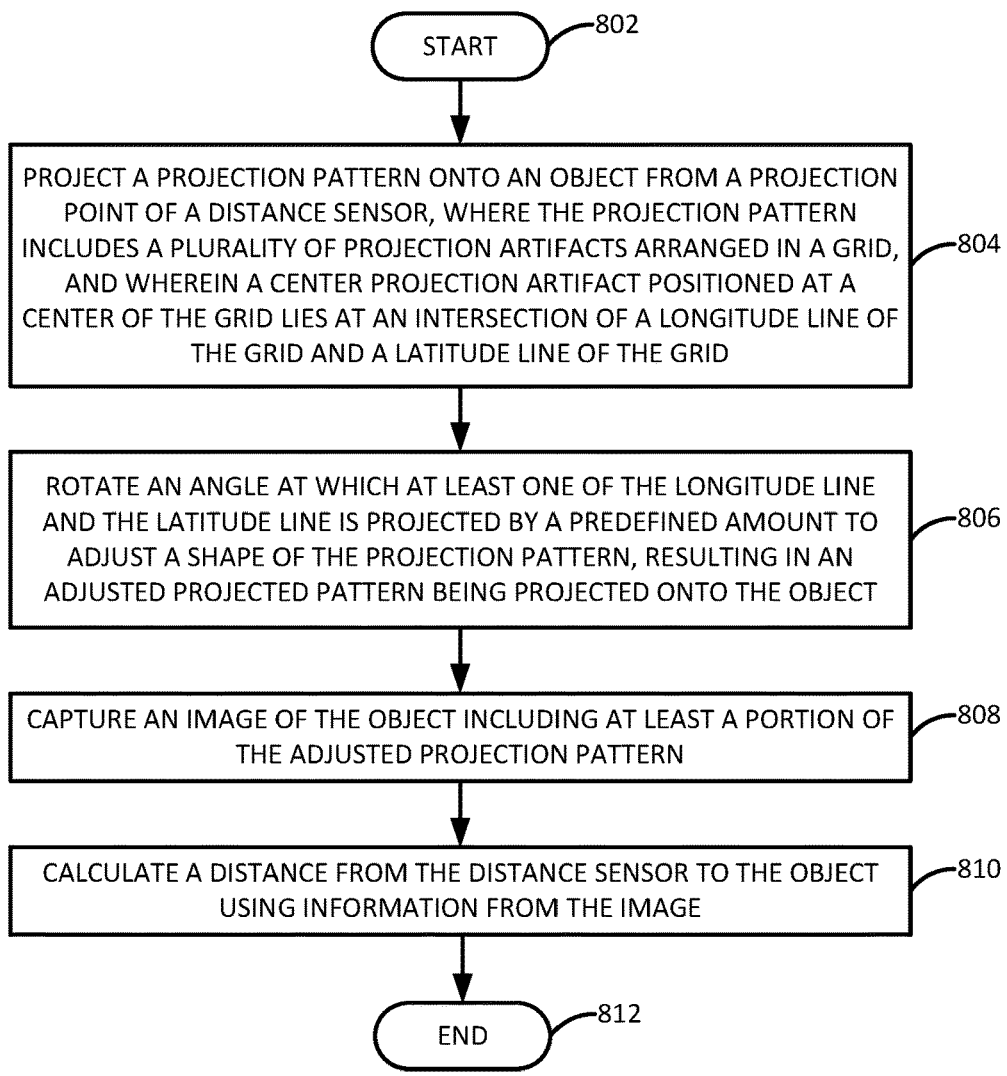
FIG. 8 illustrates a flow diagram of an example method for calculating the distance from a sensor to an object.
Figure 9:
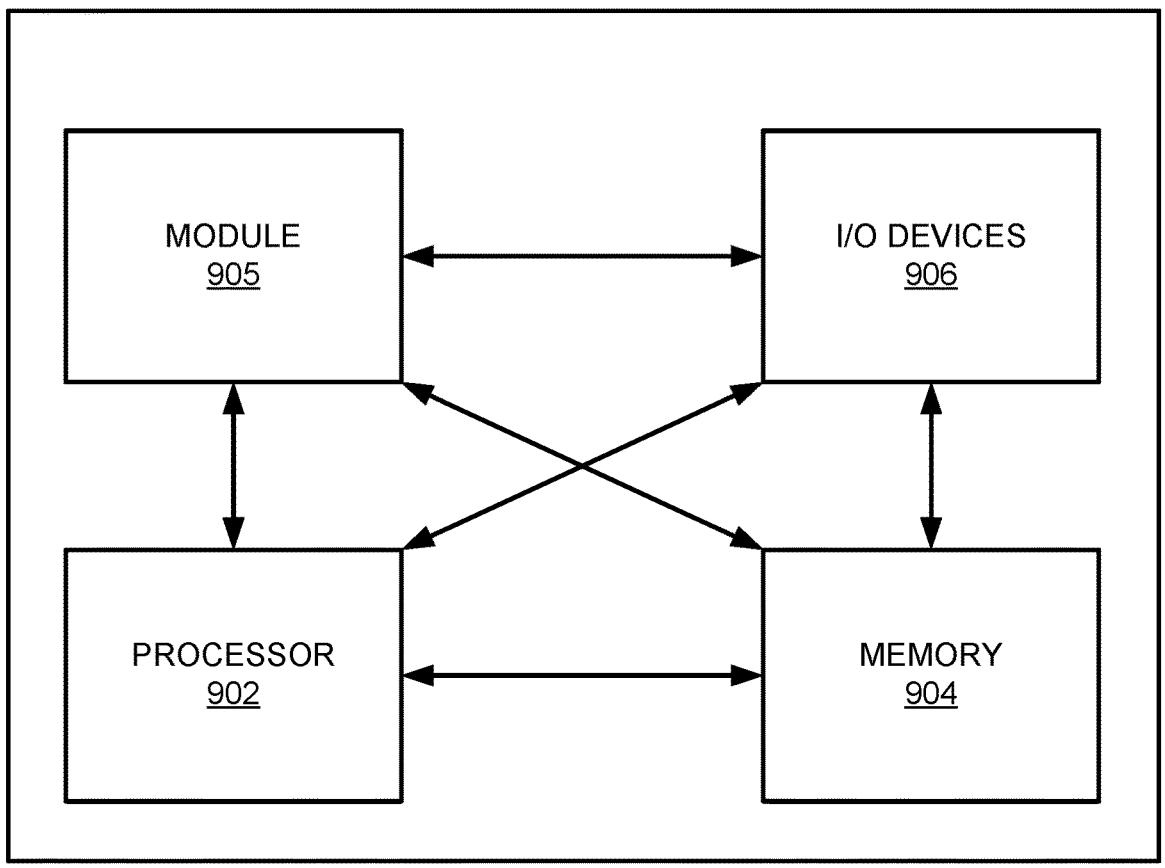
FIG. 9 depicts a high-level block diagram of an example electronic device for calculating the distance from a sensor to an object.

FIG. 8 illustrates a flow diagram of an example method 800 for calculating the distance from a sensor to an object. In one embodiment, the method 800 may be performed by a processor integrated in an imaging sensor (such as any an imaging sensor of a distance sensor) or a general purpose computing device as illustrated in FIG. 9 and discussed below.

The method 800 begins in step 802. In step 804, a projection pattern may be projected onto an object from a projection point of a distance sensor. As discussed above, the projection pattern may be created by projecting a plurality of beams from the projection point such that, when the plurality of beams is incident upon the object, a pattern of projection artifacts (e.g., dots, dashes, x's or the like) is visible at least by an imaging sensor. The pattern may comprise a rectangular grid into which the projection artifacts are arranged (e.g., as a plurality of rows and a plurality of columns).

As also discussed above, a center projection artifact of the projection pattern is created at an intersection of a longitude line (e.g., center column) and a latitude line (e.g., center row) of the projection pattern.

In step 806, an angle at which at least one of the longitude line and the latitude line is projected may be rotated by a predefined amount to adjust a shape of the projection pattern, resulting in an adjusted projection pattern being projected onto the object. In one example, the shape of the projection pattern is adjusted to compensate for a shape of the object onto which the projection pattern is projected. For instance, if the object has a spherical or rounded surface, the projection pattern may appear distorted if not properly adjusted. This distortion may cause the trajectories of some projection artifacts to overlap. In one example, the longitude line may be rotated from its original position by a first predetermined angle, while the latitude line is rotated from its original position by a second predetermined angle. The first predetermined angle and the second predetermine dangle may be equal or unequal.

In step 808, at least one image of the object may be captured. At least a portion of the adjusted projection pattern may be visible on the surface of the object.

In step 810, the distance from the distance sensor to the object may be calculated using information from the image(s) captured in step 808. In one embodiment, a triangulation technique is used to calculate the distance. For example, the positional relationships between the plurality of projection artifacts that make up the projection pattern can be used as the basis for the calculation.

The method 800 ends in step 812. The method 800 may be repeated (either in parallel or sequentially) for additional projection points of the distance sensor.

It should be noted that although not explicitly specified, some of the blocks, functions, or operations of the method 800 described above may include storing, displaying and/or outputting for a particular application. In other words, any data, records, fields, and/or intermediate results discussed in the method 800 can be stored, displayed, and/or outputted to another device depending on the particular application. Furthermore, blocks, functions, or operations in FIG. 8 that recite a determining operation, or involve a decision, do not imply that both branches of the determining operation are practiced. In other words, one of the branches of the determining operation may not be performed, depending on the results of the determining operation.

FIG. 9 depicts a high-level block diagram of an example electronic device 900 for calculating the distance from a sensor to an object. As such, the electronic device 900 may be implemented as a processor of an electronic device or system, such as a distance sensor.

As depicted in FIG. 9, the electronic device 900 comprises a hardware processor element 902, e.g., a central processing unit (CPU), a microprocessor, or a multi-core processor, a memory 904, e.g., random access memory (RAM) and/or read only memory (ROM), a module 905 for calculating the distance from a sensor to an object, and various input/output devices 906, e.g., storage devices, including but not limited to, a tape drive, a floppy drive, a hard disk drive or a compact disk drive, a receiver, a transmitter, a display, an output port, an input port, and a user input device, such as a keyboard, a keypad, a mouse, a microphone, and the like.

Although one processor element is shown, it should be noted that the electronic device 900 may employ a plurality of processor elements. Furthermore, although one electronic device 900 is shown in the figure, if the method(s) as discussed above is implemented in a distributed or parallel manner for a particular illustrative example, i.e., the blocks of the above method(s) or the entire method(s) are implemented across multiple or parallel electronic devices, then the electronic device 900 of this figure is intended to represent each of those multiple electronic devices.

It should be noted that the present disclosure can be implemented by machine readable instructions and/or in a combination of machine readable instructions and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the blocks, functions and/or operations of the above disclosed method(s).

In one example, instructions and data for the present module or process 905 for calculating the distance from a sensor to an object, e.g., machine readable instructions can be loaded into memory 904 and executed by hardware processor element 902 to implement the blocks, functions or operations as discussed above in connection with the method 800. Furthermore, when a hardware processor executes instructions to perform "operations", this could include the hardware processor performing the operations directly and/or facilitating, directing, or cooperating with another hardware device or component, e.g., a co-processor and the like, to perform the operations.

The processor executing the machine readable instructions relating to the above described method(s) can be perceived as a programmed processor or a specialized processor. As such, the present module 905 for calculating the distance from a sensor to an object of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or an electronic device such as a computer or a controller of a safety sensor system.

It will be appreciated that variants of the above-disclosed and other features and functions, or alternatives thereof, may be combined into many other different systems or applications. Various presently unforeseen or unanticipated alternatives, modifications, or variations therein may be subsequently made which are also intended to be encompassed by the following claims.

What is claimed is:
1. A method, comprising:
projecting a projection pattern onto a surface of an object from a projection point of a distance sensor, wherein the projection pattern is created by a plurality of beams of light projected from the projection point, wherein the plurality of beams of light creates a plurality of projection artifacts that is arranged in a grid on the surface of the object, wherein a center projection artifact of the plurality of projection artifacts lies at an intersection of a longitude line of the grid and a latitude line of the grid, wherein each projection artifact of the plurality of projection artifacts has a trajectory, and wherein the trajectory of a given projection artifact of the plurality of projection artifacts describes a movement of the given projection artifact on the surface of the object as the distance from a baseline of the distance sensor to the object changes;

adjusting a projection of the plurality of beams so that at least one of the longitude line and the latitude line is rotated by a predetermined amount from an original position to a new position, resulting in an adjusted projection pattern being projected onto the surface of the object, wherein an overlap of the trajectory of the given projection artifact with a trajectory of another projection artifact of the plurality of projection artifacts is minimized by the adjusted projection pattern;

capturing an image of the object, including at least a portion of the adjusted projection pattern; and calculating a distance from the distance sensor to the object using information from the image.

2. The method of claim 1, wherein the grid comprises a plurality of rows and a plurality of columns.

3. The method of claim 2, wherein the plurality of columns is arranged in a staggered pattern, such that those projection artifacts of the plurality of artifacts that reside in a common row are non-collinear.

4. The method of claim 1, wherein the distance corresponds to a radius of a spherical surface centered on a principal point of a lens of the distance sensor.

5. The method of claim 1, wherein a plane of the projection pattern is parallel to the baseline of the distance sensor, and wherein the baseline is defined as a lateral distance between a central axis of the projection point and a central axis of a lens of the distance sensor.

6. The method of claim 1, wherein the adjusting comprises:
rotating the longitude line by a first angle; and
rotating the latitude line by a second angle.

7. The method of claim 6, wherein the first angle and the second angle are equal.

8. The method of claim 6, wherein the first angle and the second angle are unequal.

9. The method of claim 1, wherein the projection point and a lens of the distance sensor are mounted in a common plane, so that the projection point is level with a principal point of an imaging capturing device to which the lens is connected in a direction of an optical axis of the image capturing device.

10. The method of claim 9, wherein the principal point is a front nodal point of the lens.

11. The method of claim 1, wherein a field of view of an image device used to capture the image is hemispherical.

12. A non-transitory machine-readable storage medium encoded with instructions executable by a processor, wherein, when executed, the instructions cause the processor to perform operations comprising:
projecting a projection pattern onto a surface of an object from a projection point of a distance sensor, wherein the projection pattern is created by a plurality of beams of light projected from the projection point, wherein the plurality of beams of light creates a plurality of projection artifacts that is arranged in a grid on the surface of the object, wherein a center projection artifact of the plurality of projection artifacts lies at an intersection of a longitude line of the grid and a latitude line of the grid, wherein each projection artifact of the plurality of projection artifacts has a trajectory, and wherein the trajectory of a given projection artifact of the plurality of projection artifacts describes a movement of the given projection artifact on the surface of the object as the distance from a baseline of the distance sensor to the object changes;

adjusting a projection of the plurality of beams so that at least one of the longitude line and the latitude line is rotated by a predetermined amount from an original position to a new position, resulting in an adjusted projection pattern being projected onto the surface of the object, wherein an overlap of the trajectory of the given projection artifact with a trajectory of another projection artifact of the plurality of projection artifacts is minimized by the adjusted projection pattern;

capturing an image of the object, including at least a portion of the adjusted projection pattern; and calculating a distance from the distance sensor to the object using information from the image.

13. The non-transitory machine-readable storage medium of claim 12, wherein a plane of the projection pattern is parallel to the baseline of the distance sensor, and wherein the baseline is defined as a lateral distance between a central axis of the projection point and a central axis of a lens of the distance sensor.

14. The non-transitory machine-readable storage medium of claim 12, wherein the adjusting comprises:
rotating the longitude line by a first angle; and
rotating the latitude line by a second angle.

15. The non-transitory machine-readable storage medium of claim 12, wherein the projection point and a lens of the distance sensor are mounted in a common plane, so that the projection point is level with a principal point of an imaging capturing device to which the lens is connected in a direction of an optical axis of the image capturing device.

16. The non-transitory machine-readable storage medium of claim 15, wherein the principal point is a front nodal point of the lens.

17. The method of claim 1, wherein a source of all projection artifacts of the plurality of projection artifacts is the projection point.

18. The method of claim 1, wherein the adjusting rotates the at least one of the longitude line and the latitude line without rotating all lines of the grid.

\* \* \* \* \*